(12) United States Patent
Anderson et al.

(10) Patent No.: US 7,921,763 B2
(45) Date of Patent: Apr. 12, 2011

(54) BRAKING CONTROL SYSTEM COMPRISING A FORCE-CONTROL SIMULATOR

(75) Inventors: Chris Anderson, Paris (FR); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 376 days.

(21) Appl. No.: 12/160,437

(22) PCT Filed: Jan. 10, 2007

(86) PCT No.: PCT/EP2007/000161
§ 371 (c)(1),
(2), (4) Date: Jul. 10, 2008

(87) PCT Pub. No.: WO2007/080106
PCT Pub. Date: Jul. 19, 2007

(65) Prior Publication Data
US 2010/0154408 A1    Jun. 24, 2010

(30) Foreign Application Priority Data

Jan. 10, 2006 (FR) ..................... 06 00210
Jan. 10, 2006 (FR) ..................... 06 00211

(51) Int. Cl.
*F15B 9/10* (2006.01)
(52) U.S. Cl. .................................. 91/376 R
(58) Field of Classification Search ............ 60/556; 91/369.1, 373, 376 R
See application file for complete search history.

(56) References Cited

U.S. PATENT DOCUMENTS

| | | | | |
|---|---|---|---|---|
| 3,894,390 | A | * | 7/1975 | Belart et al. ............. 91/372 |
| 6,568,768 | B1 | * | 5/2003 | Oka et al. ............... 91/376 R |
| 7,104,612 | B2 | * | 9/2006 | Terazawa et al. ......... 91/369.1 |
| 2006/0163941 | A1 | | 7/2006 | Von Hayn et al. |

FOREIGN PATENT DOCUMENTS

| | | |
|---|---|---|
| DE | 102004005107 A1 | 8/2005 |
| FR | 2629033 A1 | 9/1989 |
| GB | 2200419 A | 8/1988 |
| WO | WO 2005019008 A1 * | 3/2005 |

OTHER PUBLICATIONS

PCT/EP2007/000161 International Search Report.

* cited by examiner

*Primary Examiner* — Michael Leslie
(74) *Attorney, Agent, or Firm* — Michael Best & Friedrich LLP (57) ABSTRACT

The invention relates to a brake control system for motor vehicles comprising a brake pedal (1), a brake booster (4), a brake master cylinder (5). The system of the invention further comprises a simulator (3) pneumatically coupled to the piston (42) of the brake booster (4). This simulator (3) receives at least one brake command from the brake pedal (1) and in return establishes a pressure difference between the front chamber (40) and the rear chamber (41) of the booster so as to cause the piston (42) to move.

16 Claims, 7 Drawing Sheets

BRAKING CONTROL SYSTEM COMPRISING A FORCE-CONTROL SIMULATOR

BACKGROUND OF THE INVENTION

The invention relates to a brake control system for motor vehicles and, in particular, to a hydraulic control system. The invention also applies to hybrid braking systems such as those provided in hybrid vehicles (vehicles propelled electrically and propelled using internal combustion engines) comprising a hydraulically operated braking system and an electric braking system using the electric propulsion motor or motors as electric generators.

In the prior art of motor vehicle hydraulic braking systems, a brake booster essentially comprises a space comprising two chambers (the front chamber or vacuum chamber and the rear chamber or working chamber) which are separated by a moving membrane secured to a piston. A control rod can move toward the front of the vehicle when the driver of the vehicle operates the brake pedal. This movement of the control rod is passed on to a plunger which actuates boost means and the booster piston. In general, these boost means comprise a three-way valve actuation on which is able to interrupt communication between the vacuum chamber and the working chamber of the booster and to connect the latter chamber to the ambient atmosphere. Given that the vacuum chamber is normally under vacuum, and because of the pressure difference between the two chambers, a boost force is applied to the piston separating the two chambers. The piston therefore moves forward, acting on a push rod that serves to actuate the master cylinder of the braking circuit.

The control rod which is actuated by the brake pedal is in contact with the piston of the booster, which is in contact with the push rod which acts on the piston of the master cylinder. The various parts that couple the brake pedal to the master cylinder piston are therefore in contact with one another. The driver therefore feels the reaction of the braking circuit through the brake pedal.

However, if a device on the vehicle displaces some brake fluid from some point in the braking circuit towards the master cylinder then there will be a reaction on the brake pedal and this reaction will be felt by the driver. For example, under braking that would have a tendency to lock up the wheels of the vehicle, the antilock braking system (ABS) has the task of reducing the braking effort and, in order to do so, of extracting brake fluid from the wheel cylinders and injecting it into the master cylinder. Alternatively, in electronic stability programs (ESP) that provide dynamic course control, a hydraulic unit is capable of acting on one or more braking circuits independently of the brake commands and this action is also felt at the brake pedal and, if the driver is braking when the ESP cuts in, he will experience a variation in the feel of the brakes which will not necessarily correspond to the feel to which he is accustomed.

It should also be pointed out that because the effect of the hydraulic unit injecting brake fluid into the braking circuit is to move back the pistons of the master cylinder, it also has the effect of causing the brake pedal to move back. If this occurs at the very moment that the driver is exerting a relatively high braking force, then the backward movement of the brake pedal is absorbed by the driver's ankle and this may, at the very least, prove to be unpleasant for the driver. In addition, a backward movement of the master cylinder pistons may even result in bodily injury (may break the driver's ankle for example) in an accident, particularly a frontal impact, that occurs while the driver is applying a strong pressure to the brake pedal.

It may therefore prove beneficial for the onward transmission of all these effects that are brought about in the braking circuits and/or in the master cylinder, towards the brake pedal, to be lessened, if not eliminated or absorbed.

One way to resolve these disadvantages is to provide electrical control of the control system and to provide a system which applies to the brake pedal mechanical commands that simulate the feel of the brakes that the driver is accustomed to feeling with a conventional braking system under the same braking conditions. In the remainder of the description, this device will be termed a "brake feel simulator". In a system such as this, the actual braking devices are therefore disconnected from the brake feel simulator which in response to the braking applies effects to the brake pedal.

However, such systems are expensive by comparison with conventional hydraulic braking systems. Introducing electrical controls and connections generally presents problems with reliability. These systems are therefore even more expensive if they are subjected to the same reliability and safety requirements as conventional hydraulic systems.

Furthermore, so-called hybrid vehicles which have both an electric propulsion motor powered by batteries for propelling the vehicle and an internal combustion engine (running on gasoline, diesel oil, gas or any other fuel) are generally equipped with electric brakes in which braking is obtained by inductive braking with the recuperation of energy from the electric propulsion motor of the vehicle. The electric propulsion motor then acts as an electric generator, the electrical energy recuperated being used to recharge the batteries, something which is advantageous in the use of the vehicle.

In these systems, it is also possible to vary the electric braking torque. Under braking, the maximum amount of electric braking is therefore not always applied. This may for example be the case when use is being made of a radar providing information on the road condition, or when operating the brake pedal somewhat quickly (for example when braking hard and then releasing the brake pedal).

Provision may also be made for an opposite current to be transmitted to the electric motor either for safety reasons or for reasons associated with the feel of the brake pedal.

Figure 1:
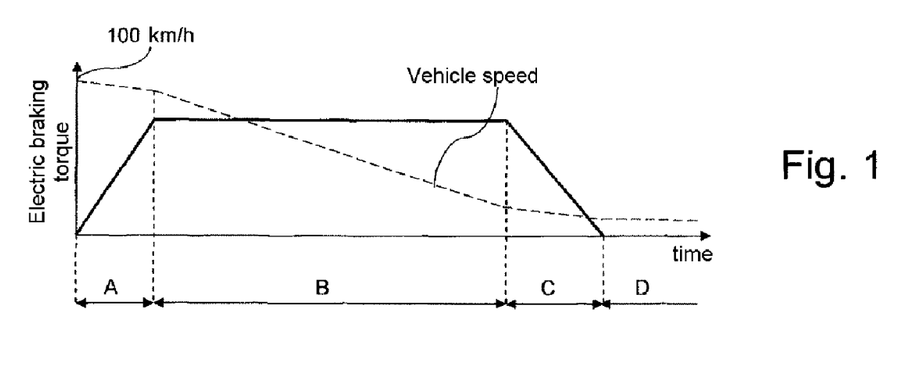
FIGS. 1 and 2: operating curves already described previously.

However, electric braking is not entirely satisfactory. FIG. 1 schematically, in continuous line, shows a braking curve (braking torque as a function of time) of an electric braking system such as this alone. This same graph also shows, in dotted line, the speed of the vehicle. In a first braking region A, the braking increases progressively until it reaches full effectiveness in a second braking region B, then, as the vehicle speed becomes low, in a third region C, the braking torque decreases and becomes practically non-existent in a fourth region D. A braking system such as this is imperfect because in region A braking does not become fully effectively quickly and because in regions C and D the braking effect diminishes when the vehicle is at low speed. Operation such as this is depicted in FIG. 1 by the curve in dotted line.

To remedy this disadvantage of recuperative electric braking, it is necessary for a hydraulic braking system to provide supplementary braking in regions A, C and D.

Figure 2:
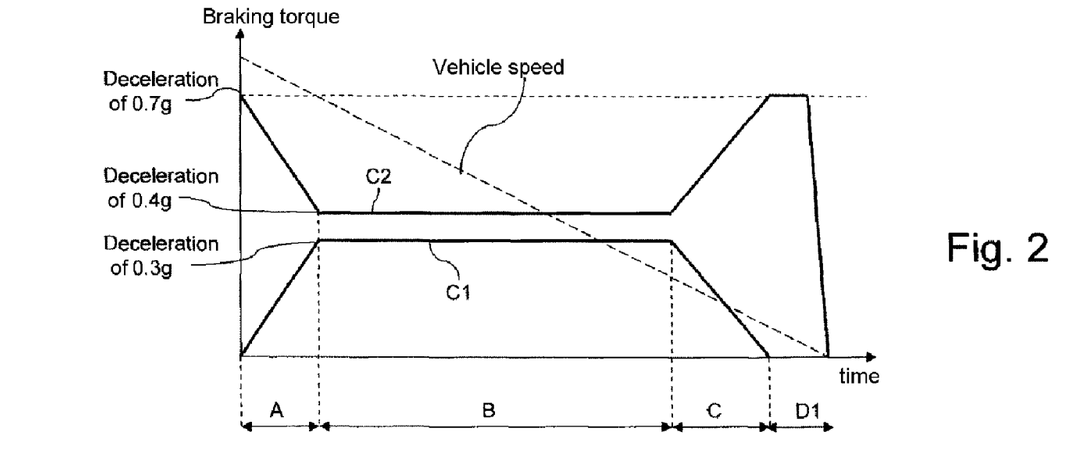

FIG. 2 shows curves of the operation of the electric braking system and of the hydraulic braking system.

Curve C1 is the recuperative electric braking curve which corresponds to that of FIG. 1. If a vehicle deceleration of 0.7 g for example is desired, and the electric braking system is capable of achieving a maximum deceleration of 0.3 g, then the braking curve applied by the hydraulic braking system needs to be schematically that represented by curve C2. In region A, the hydraulic braking torque will achieve a deceleration of 0.7 g as quickly as possible and will then decrease until the electric braking torque reaches its maximum value and the equivalent deceleration due to this electric braking torque is 0.3 g. In this way, at every moment the sum of the torques supplied by the electric and hydraulic braking systems provides a deceleration of 0.7 g. In region B, the hydraulic braking system supplements the electric braking system in order also to obtain a deceleration of 0.7 g. Thereafter, in region C, the braking torque of the hydraulic system is increased in order once again to provide supplementary braking to the electric braking system and, in region D, to remedy the fact that electric braking torque is practically non-existent.

Furthermore, disregarding the response times of the recuperative electric braking system, this system is not able always to respond in the same way because the load on the recuperative braking circuit may vary. This is particularly true when the recuperative circuit essentially includes the vehicle batteries. In such a case, the load can vary according to the state of the batteries.

In such systems, a control circuit, for example a computer, has to manage the operation of the braking systems. This computer is called into operation for each braking action. It has been found that electrically controlled systems are vulnerable whereas hydraulically controlled systems using brake boosters are proven and remain less expensive than electrically controlled systems.

SUMMARY OF THE INVENTION

The invention therefore relates to a braking system capable of solving these problems and advantageously to a braking system in which the devices for braking the wheels of the vehicle are actuated hydraulically. In addition, this system will be able to decouple the brake pedal from the effects brought about in the vehicle braking circuits by the various vehicle systems such as the antilock braking system (ABS) or the electronic stability program (ESP) but will pass on to the brake pedal effects that simulate the feeling of braking.

The invention therefore relates to a brake control system for a motor vehicle comprising:
  a brake pedal,
  a brake booster which comprises a front chamber and a rear chamber which are separated by a booster piston, the booster supplying an amplified braking command dependent on the pressure difference between the two, front and rear, chambers,
  a brake master cylinder receiving the amplified braking commands from the brake booster.

According to the invention, this system comprises a simulator pneumatically coupled to the piston of the brake booster. This simulator, which receives at least a braking command from the brake pedal, in return establishes or controls a pressure difference between the front chamber and the rear chamber of the brake booster so as to control the movement of the booster piston. Advantageously, the simulator is a pneumatic simulator.

According to one embodiment of the invention, this system comprises a pneumatic servomotor for controlling a pneumatic brake booster.

Advantageously, said control servomotor comprises a space comprising a first bore in which there slides a three-way valve piston equipped with a three-way valve capable of:
  placing the rear chamber in communication with the front chamber;
  or of isolating the rear chamber from the front chamber;
  or of placing the rear chamber in communication with a pressure source that establishes a pressure difference between the front chamber and the rear chamber.

According to the invention, provision is preferably made for a first region of the first bore lying on one side of the three-way valve piston to be substantially at the same pressure as the front chamber, and for a second region of this bore, lying on the opposite side of the rear chamber to the three-way valve piston to be substantially at the same pressure as the rear chamber.

According to one embodiment of the invention, provision may be made for said space to have a first end lying in the rear chamber of the booster, near to said booster piston, and a second end lying on the opposite side of the booster wall to the side to which the brake master cylinder is attached. In this embodiment, the first region of the first bore lies between said three-way valve piston and the first end, while the second region of the first bore lies between the three-way valve piston and the second end.

According to one embodiment of the invention, the three-way valve comprises:
  a valve body having a first valve seat,
  a valve shutter capable of moving axially and intended, by pressing against the first valve seat, to close off a first passage of the three-way valve and thus isolate the front and rear chambers from one another,
  an axially movable sensor having a second valve seat intended to press against the valve shutter and to open a second passage between the rear chamber and a source of raised pressure by moving away from the valve shutter.

The invention may also make provision for said space to comprise a second bore situated on the same side as the first end of the chamber and in which there slides a control piston. This control piston is controlled by the brake pedal and controls the axial movement of the sensor of the three-way valve. This second bore also comprises an elastic element which offers elastic resistance to the movement of the control piston.

Advantageously, the control piston allows action upon a rod for axially moving said sensor.

According to an alternative form of embodiment of the invention, the second bore contains a fluid.

According to this alternative form of embodiment, the second bore may be supplied with fluid from the brake fluid reservoir.

According to one embodiment of the invention, said space is held against the rear wall of the brake booster by a retaining spring and by the pressure obtaining in the brake master cylinder when the axial force exerted on the control piston is below a threshold value, and it can move axially when this force exceeds this threshold value.

According to an alternative form of embodiment, the system of the invention comprises an intermediate hydraulic or pneumatic control device controlled by the brake pedal and hydraulically or pneumatically controlling the control piston.

Advantageously, said elastic element is a spring (310).

BRIEF DESCRIPTION OF THE DRAWINGS

The various objects and features of the invention will become more clearly apparent from the following description given by way of example in conjunction with the attached figures which depict:

FIG. 4b: one exemplary embodiment of the pneumatic control system of the braking system of FIG. 4a;

FIGS. 4c and 4d: various operating states of the simulator of FIG. 4a;

FIG. 5: an alternative form of embodiment of the braking system of FIG. 4a.

DETAILED DESCRIPTION

An overall exemplary embodiment of a braking system circuit control according to the invention will thus be described with reference to FIG. 3.

This system comprises, in a way known per se, a brake booster 4, which in the remainder of the description will be referred to as a brake servo, and which comprises a working chamber 41 and a vacuum chamber 40 which are separated by a brake servo membrane or piston 42 capable of moving along the axis of the brake servo 4. The movement of the piston 42 via a push rod 43 controls the movement of the pistons, such as 50, of a brake master cylinder 5. This master cylinder induces pressures in the vehicle braking circuits 6.

According to the invention, there is an intermediate hydraulic, pneumatic or mechanical device 3 that we shall call the simulator 3 in the remainder of the description. A braking control device or brake pedal 1, which is actuated by the driver of the vehicle, controls the simulator 3. The latter notably comprises a component 8 which has the form of a space and which in the remainder of the description we shall refer to as the space 8. This enclosure 8 is held in the rear wall 46 of the servo. It comprises a bore 89 in which there can slide a piston 30 containing a three-way valve.

This three-way valve is capable:
either of placing the working chamber 41 in communication with the vacuum chamber 40. In this case, the pressures across the two sides of the piston 42 are substantially balanced and this piston remains immobile;
or of isolating the working chamber 41 from the vacuum chamber 40 (this is a start-of-braking phase);
or of placing the working chamber 41 in communication with the atmospheric air by isolating the working chamber from the vacuum chamber. A pressure difference is created between the vacuum chamber 40 and the working chamber 41. The booster piston is urged to move toward the vacuum chamber (to the left in FIG. 3). The movement of the booster piston 42 has the effect of pushing the push rod 43 toward the brake master cylinder 5. The booster therefore supplies the brake master cylinder with a braking force.

In a system such as this, the brake pedal is thus mechanically uncoupled from the brake booster 4, from the brake master cylinder 5 and from the hydraulic braking circuits 6 of the vehicle.

Furthermore, the simulator 3 may comprise an elastic element (not depicted in FIG. 3) between the brake pedal and the control of the three-way valve. This elastic element is intended to offer a force resisting the command to move the brake pedal, thus having the effect of simulating, for the driver's benefit, the braking forces exerted.

Furthermore, the primary piston 50 of the master cylinder 5 is not connected to the three-way valve (in normal operation).

Finally, an elastic element located between the brake pedal and the control of the three-way valve feeds back braking force to the brake pedal.

Advantageously, direct or indirect anchoring of the control rod controlled by the brake pedal to the servo piston 42 is avoided, thus avoiding direct coupling between the piston 42 and the control rod and hence the brake pedal. Thus, a variation in the braking commanded by the braking system is not felt by the driver.

As a preference, system safety is improved through the fact that thrust on the control rod drives at least the primary piston of the master cylinder and normally also the pneumatic piston of the brake servo.

In addition, the travel of the control rod (what is known in the English language as the "pedal feel") can be optimized independently so as to promote driver comfort and the travel of the pneumatic piston of the brake servo that drives the piston of the master cylinder can be optimized independently in order to obtain the desired braking. Typically, the control travel is shorter than the travel of the pistons of the master cylinder.

The system of the invention has the advantages of:
making the force exerted on the brake pedal, the travel of the brake pedal and the pressure in the braking circuit completely independent.
filtering out disturbances from the hydraulic circuit (for example the vibrational hydraulic pulsation that occurs when the ABS system is in operation),
achieving insensitivity to major displacements of brake fluid, for example in large-sized brakes (large-diameter brakes and/or brakes with long travel) and to variations in absorption,
being insensitive to transfers of volumes of brake fluid caused by a hydraulic unit, in one direction or the other, between the vehicle brakes and the master cylinder.

Furthermore, the simulator 3 may comprise an elastic element (not depicted in FIG. 3) offering a force resisting the command to move the brake pedal and thus having the effect of simulating, for the driver's benefit, the braking forces exerted.

When a braking command is applied via the brake pedal, the three-way valve of the piston 30, after having isolated the working chamber 41 from the vacuum chamber 40, connects the working chamber 41 to the atmospheric surroundings. The piston 30 moves to the left in the bore 89. The piston 42 also moves to the left and pushes the push rod 43 which causes the piston 50 of the master cylinder 5 to move to the left.

It can therefore be seen that the simulator 3 is able to control the operation of the brake servo without there being any mechanical contact between the control rod actuated by the brake pedal and the push rod 43. Control is purely pneumatic.

A more detailed description of an exemplary embodiment of a braking control system according to the invention will now be given with reference to FIG. 4a.

Figure 3:
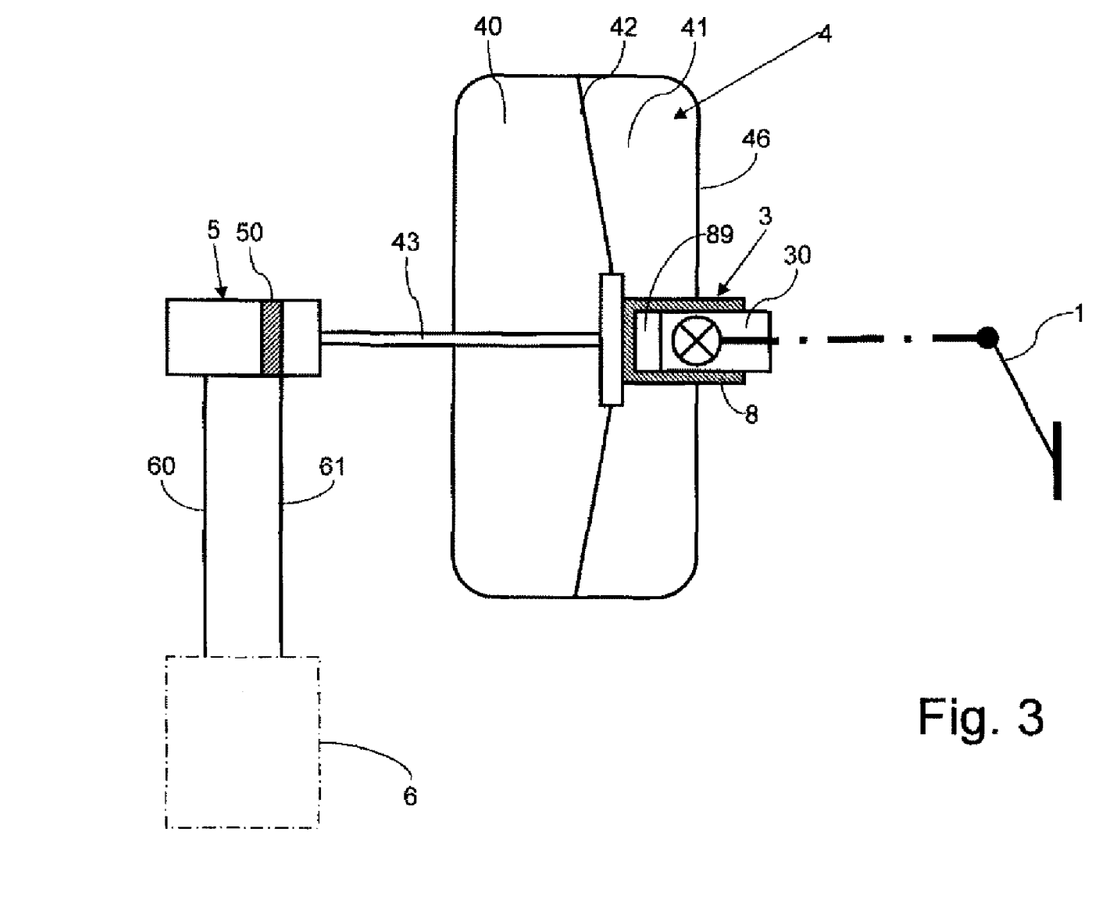
FIG. 3: one overall exemplary embodiment of the brake circuit control system according to the invention.
Figure 4A:
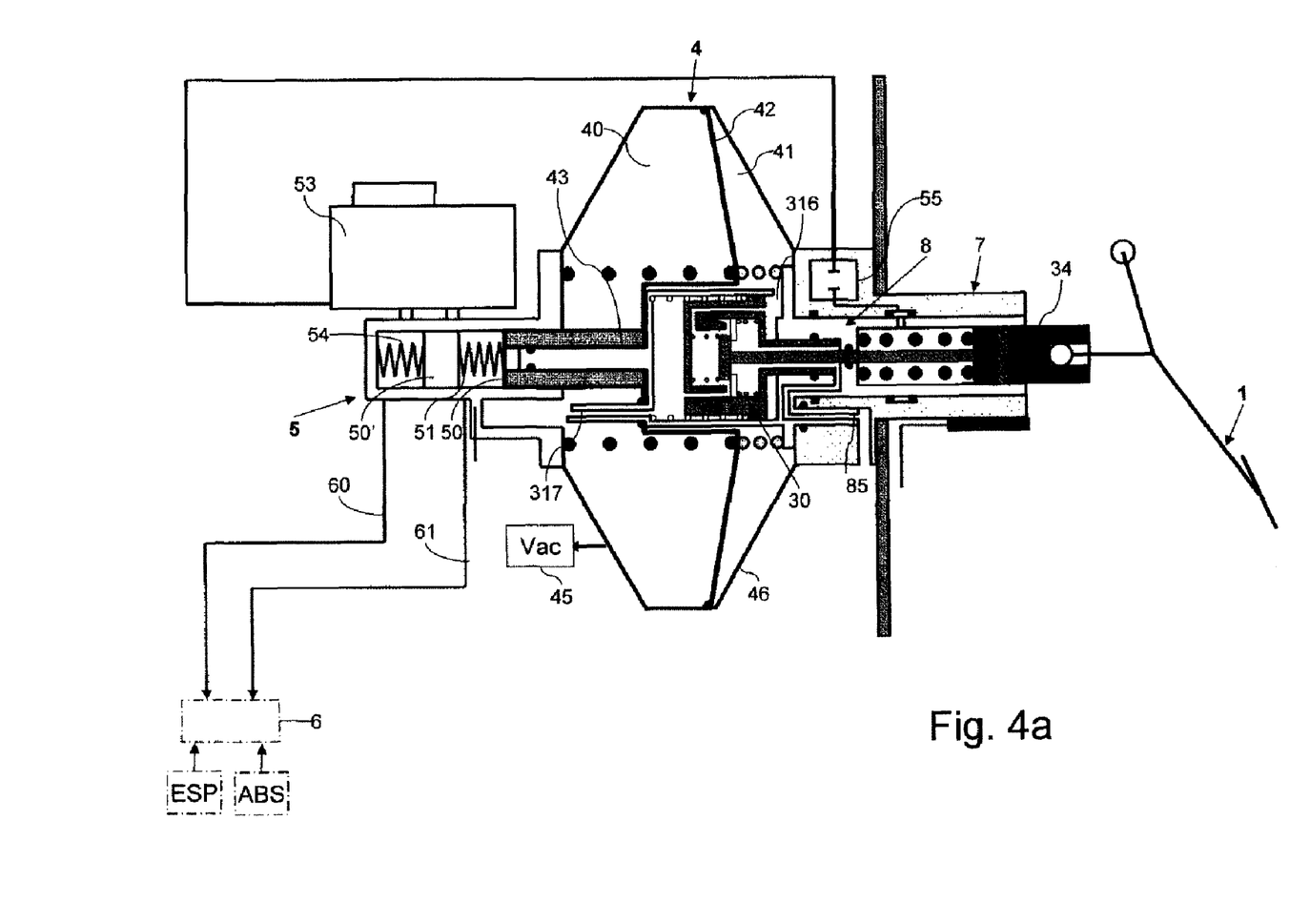
FIG. 4a: one exemplary embodiment of the brake circuit control system according to the invention.

Those elements of FIG. 4a that perform the same function as those of FIG. 3 bear the same references thereas. The same will be true in respect of the other figures attached to this description.

This system comprises:
a brake pedal 1 that can be controlled by the driver of the vehicle,
a simulator 3 corresponding to the simulator 3 of FIG. 3. This simulator 3 is controlled by the brake pedal. The construction and operation of this device will be described in greater detail hereinbelow,
the brake booster or brake servo 4 comprising a vacuum chamber 40 (front chamber in most boosters) and a working chamber 41 (rear chamber) which are separated from one another by an axially mobile servo piston 42. A vacuum source 45 allows a vacuum to be created in the vacuum chamber 40. A movement of the piston 42 (to the left in particular) causes a push rod 43 to move.

a brake master cylinder 5 comprising pistons 50 and 50' the movements of which are controlled by the push rod 43, (to simplify matters, the push rod 43 and the primary piston 50 are depicted as a single piece in FIG. 4*a*), hydraulic braking circuits 6 capable of passing on the braking pressure to the vehicle wheel cylinder devices.

Figure 4B:
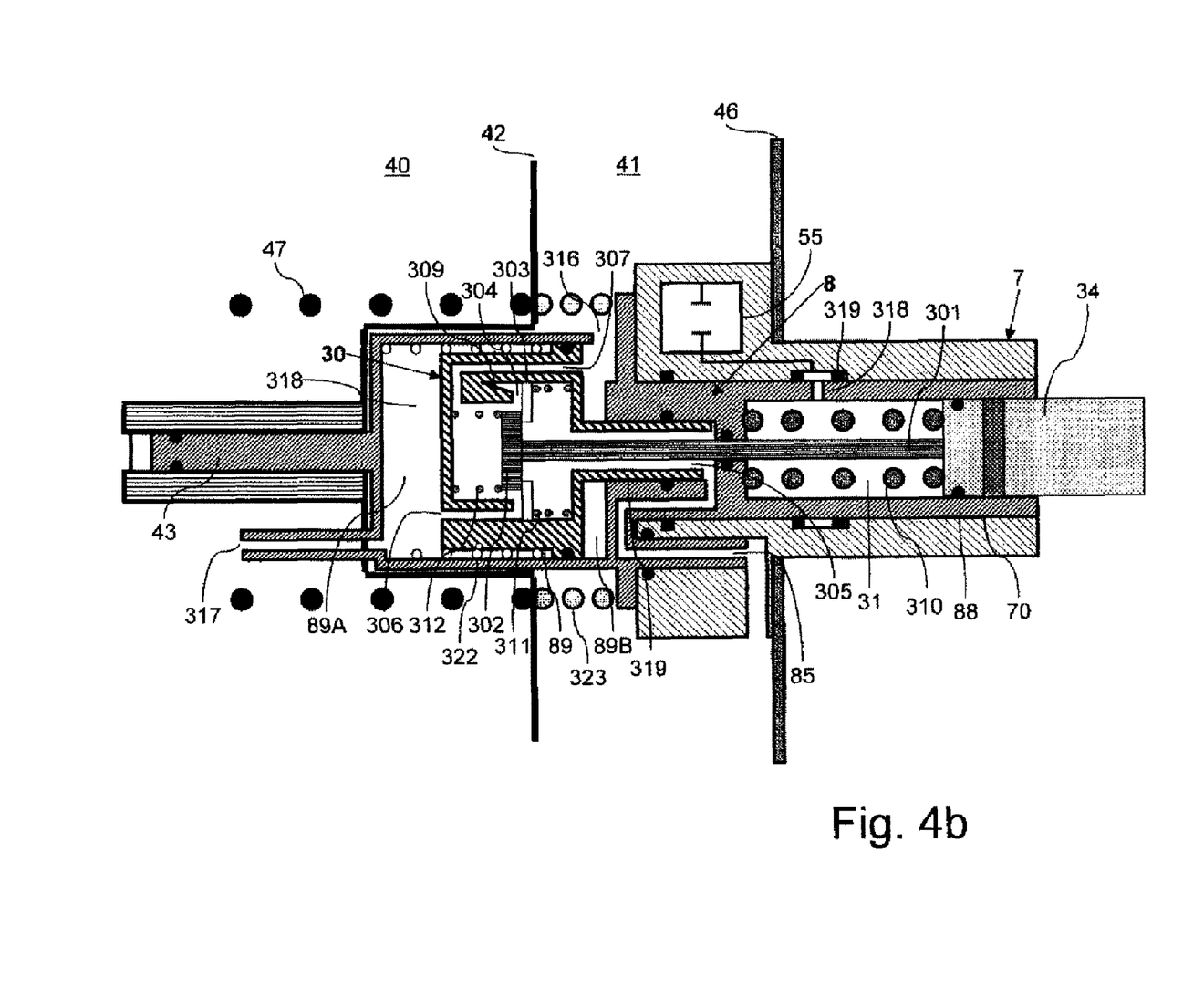

FIG. 4*b* depicts an enlarged view of the simulator 3. This device comprises a retaining piece 7 fixed in the rear wall 46 of the servo. The piece 7 comprises a bore 70 in which the space 8 is fitted. This enclosure comprises a first bore 31 in which there slides a control piston 34 and a simulation spring 310, and a second bore 89 in which the piston or three-way valve 30 is mounted.

The three-way valve comprises an axially movable control rod 301 which bears a sensor 302. This sensor may, depending on its position, be in contact with a movable valve shutter 303. The valve shutter 303 may, depending on its position, be in contact with a valve seat 309 fixed inside the three-way valve. The three-way valve 30 is situated inside the space 8 and behaves like a floating control servomotor. The space 8 in which the three-way valve 30 is situated is advantageously mounted in the servomotor that actuates the master cylinder or brake servo.

The travel/pressure law of the control servomotor and, as a consequence, that of the brake servo and therefore also that of the master cylinder is determined by the characteristics of the spring 322, particularly its stiffness.

The spring 322 pushes the three-way valve 30 back relative to the space 8, therefore to the right in the figures.

A spring 312, in the rest position, pushes the moving sensor 302 back to the right (in the figure) and a spring 311 pushes the valve shutter 303 to the left. The sensor 302 is therefore in contact with the valve shutter 303.

The three-way valve 30 also has:
a first port 306 communicating with the vacuum chamber 40,
a second port 307 communicating with the working chamber 41,
a third port 305 providing communication with the atmospheric surroundings via an access orifice 85 in the space 8.

The piston 30 of the three-way valve can slide in the cavity 89. As can be seen in FIG. 4*b*, the region 89B of the cavity 89 that lies to the right of the three-way valve communicates with the working chamber 41 via the passage 316 and is therefore at the same pressure as the working chamber 41. The region 89A of the cavity 89 that lies to the left of the three-way valve communicates with the vacuum chamber 40 via the passage 317 and is therefore at the same pressure as the vacuum chamber 40.

The simulator 3 also possesses a simulation spring 310 situated in the bore 31 of the piston 34. This spring offers resistance to the movement of the piston 34. The purpose of this spring is to simulate, for the driver's benefit, a braking force and to determine a brake pedal travel. Compression of the spring 310 thus allows the brake pedal to move (to advance), thus simulating how a conventional brake system behaves.

The brake servo 4 is as described in conjunction with FIG. 3. In addition, a vacuum source 45 allows a vacuum to be created or the pressure reduced in the vacuum chamber 40.

The brake master cylinder 5 is, for example, a tandem master cylinder supplied with brake fluid via a reservoir 53 (FIG. 4*a*).

The braking circuits 6, symbolized in chain line in FIG. 4*a*, are connected to the master cylinder by pipes 60 and 61.

Figure 4C:
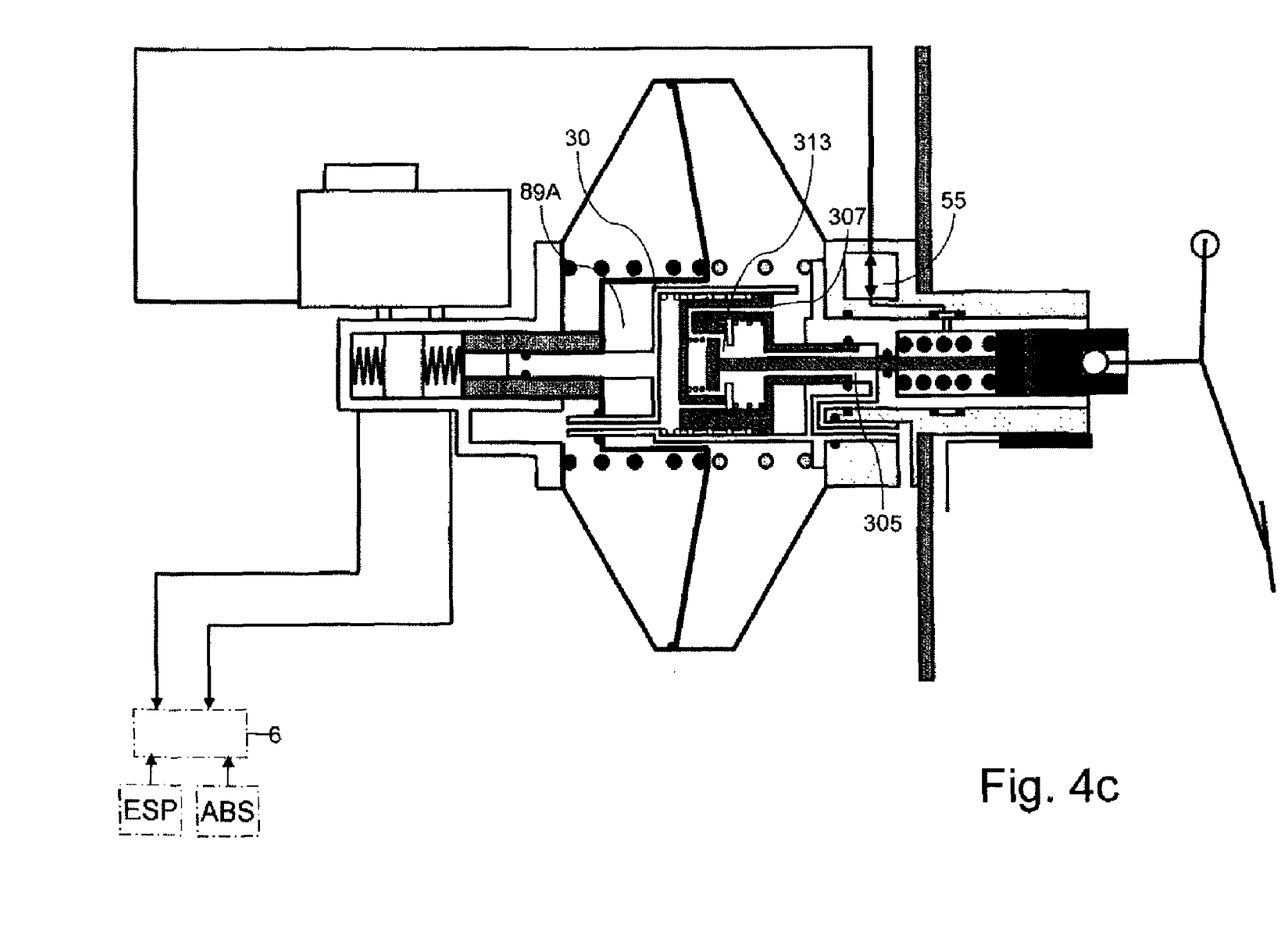

The way in which the system of FIG. 4*a* works will now be described with reference to FIG. 4*b* of the simulator 3 and to FIGS. 4*a*, 4*c* and 4*d* which depict various states of the simulator 3 at various stages of operation.

When the driver is not depressing the brake pedal 1, the braking system is at rest. The simulator 3 is in the state depicted in FIG. 4*a*. The three-way valve of the piston 30 places the vacuum chamber 40 in communication with the working chamber 41 via the ports 316, 317 and via a passage 304 there is between the valve shutter 303 and the valve seat 309 on account of the fact that the valve shutter 303 is pushed to the right by the sensor 302 (FIG. 4*b*). Because the two chambers 40 and 41 are at the same pressure, no braking force is transmitted by the brake servo 4 to the brake master cylinder 5.

When the driver depresses the brake pedal 1, the piston 30 is moved to the left and pushes the rod 301 of the feeler 302 to the left, at the same time compressing the spring 310. The sensor 302 moves to the left. The valve shutter 303, pushed by the spring 311, also moves to the left and closes the port 304. Communication between the ports 306 and 307 is closed off. The vacuum chamber 40 is isolated from the working chamber 41.

When the driver presses the brake pedal a little harder, the piston 34 moves further to the left. The sensor rod 301 and the sensor 302 also move to the left. As can be seen in FIG. 4*c*, the sensor 302 moves away from the valve shutter 303 and opens up a communication port 313 placing the ports 307 and 305 in communication with each other. The working chamber 41 is therefore placed in communication with atmospheric pressure via the three-way valve of the simulator 3.

Furthermore, the region 89B of the bore 89 that lies to the right of the piston 30 (that is to say that lies on the same side as the working chamber 41 with respect to the piston 30) is also placed at atmospheric pressure while the front region 89A of the bore 89, situated to the left of the piston 30, is at the same pressure as the vacuum chamber 40. The piston 30 is therefore forced to the left at the same time as the piston 42 is forced to the left because of the difference in pressure between the chambers 40 and 41. This being the case, the piston and the piston 42 will together move to the left. However, for a given pressure difference between the chambers 40 and 41, the lengths of travel of the piston 30 and of the piston 42 will differ.

Advantageously, the movement of the piston (or three-way valve) 30 is dependent on its cross section and on the spring 322. The movement of the piston 42 is dependent on its active surface area and on the absorption of the braking system.

In moving, the piston 42 will exert a force on the push rod 43. This push rod pushes on the primary piston 50 and, through the primary pressure, also pushes on the secondary piston 50'. The master cylinder 5 induces a braking pressure in the pipes 60 and 61 and in the braking circuits 6.

Operation of the brake pedal 1 has therefore allowed a braking command to be transmitted to the brake servo 4 via the rod 301. In return, the brake servo 4 has caused a braking pressure to be generated in the vehicle braking circuits. This operation has been achieved without there being any mechanical coupling between the brake pedal and the brake servo or master cylinder. The brake pedal is therefore decoupled from any mechanical reaction or any noise that may arise from the braking circuits.

It will be noted that, in the simulator, the braking command from the brake pedal has been passed on, with compression of the spring 310. Adjusting the elasticity of this spring (its elastic resistance) allows a braking force to be simulated at the brake pedal. It is therefore possible, for the driver's benefit, to simulate a reaction to a braking force that is similar to the reaction felt in a conventional braking system.

According to an alternative form of embodiment, the chamber 31 of the space 8 may be filled with a fluid which may be the vehicle brake fluid. This chamber is then supplied with brake fluid via a valve 55 connected to the brake fluid reservoir.

At rest (under no braking), this valve 55 is closed. Under braking, it is open (except in the event of failure as will be seen hereinafter).

In one embodiment of the invention, the brake fluid flows freely through the valve 55 with no change to the pedal feel.

In an alternative form of the embodiment, a pressure drop is generated either using a cross section of the valve 55 that generates a variable or fixed pressure drop, or by modifying the valve 55 so that the pedal feel can then be tailored to a desired model opposing rapid and unresisted forward movement of the piston 34. For a desired pedal feel, the opening of the valve 55 takes account of the stiffness of any spring 310 that might be fitted.

The brake fluid contained in the chamber 31 works in concert with the spring 310 to transmit a feeling of braking to the brake pedal.

What the invention specifically does is to make provision for the diameter of the communicating hole 318 that allows the valve 55 to communicate with the chamber 31 to be sized in such a way as to limit flows of fluid from the chamber 31 towards the valve 55. In this way, the feeling of braking fed back to the brake pedal is modified, particularly when the driver is depressing the brake pedal quickly.

However, provision may equally be made for the valve 55 to close when, for example, the driver depresses the brake pedal suddenly, thus allowing the brake command to be transmitted directly through movement of the space 8.

Finally, as will be described hereinafter, a seal 319 can be used to confine the brake fluid to the chamber 31 independently of the valve 55.

Figure 4D:
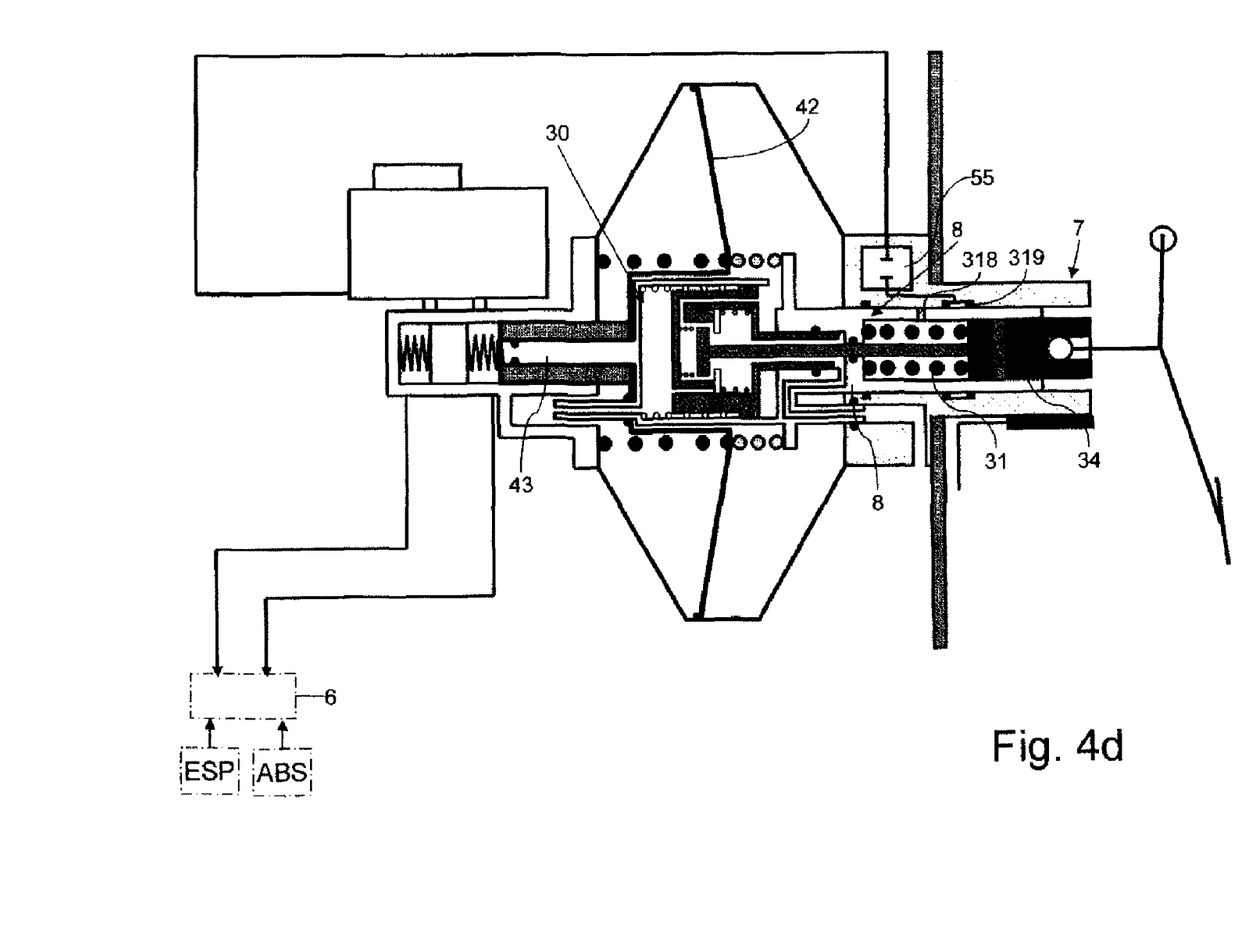

FIG. 4d illustrates how the system of FIG. 4a works if the brake servo should fail.

The simulator is positioned along the axis of the brake servo 4. Should the brake servo fail, the driver will need to press harder on the brake pedal than he would normally. As FIG. 4d shows, the piston 34 pushes the piston 30 and the latter will exert a force directly on the piston 42 which will pass this thrust on the push rod 43 on to the brake master cylinder.

The space 8 needs therefore to be retained in the retaining piece 7 in such a way that, during normal operation (when the brake servo is working), the space 8 does not move when the brake pedal commands the movement of the piston 34. To do that, the retaining spring 323 pushes the space 8 towards the retaining piece 7. In addition, as the piston 42 moves to the left under the effect of a braking command, the pressure in the master cylinder works in concert to push the space 8 toward the piece 7.

By contrast, should the brake servo fail, the space 8 needs to be able to move when the force exerted on the brake pedal exceeds a determined threshold, compressing the spring 323. In this operating scenario, the space 8 of the simulator 3 then presses on the booster piston 42 and thus the push rod 43. A braking force is therefore transmitted from the brake pedal to the brake master cylinder 5.

Furthermore, as can be seen in FIG. 4d, the port 318 which normally allows communication between the chamber 31 and the valve 55 is closed. A seal 319 hermetically isolates this port 318 as the piston 8 advances, which corresponds to defective operation of the brake servo. Thus, as soon as the piston 8 has been moved, the port 318 is shut off, the brake fluid present in the chamber 31 and compressed by the piston 34 causes the piston and, as a result, the piston 50 and the intermediate components, to move to the left.

It will be noted that in this defective operation, the valve 55 is advantageously closed so as to pass on to the master cylinder piston as much as possible of the braking force applied to the brake pedal. This operation may also be obtained by means of the piston 34 closing off the communication orifice 318.

Figure 5:
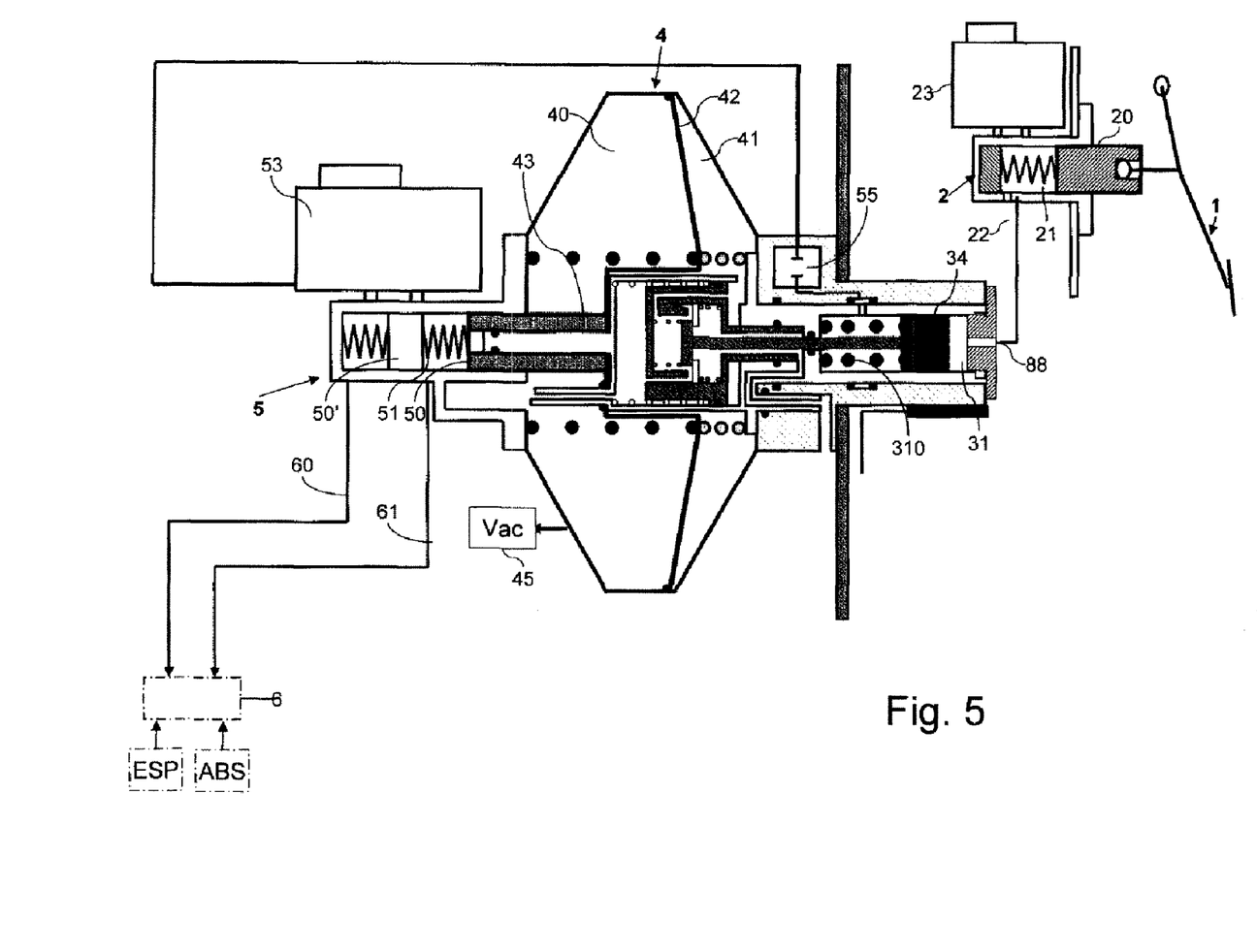

FIG. 5 depicts an alternative form of embodiment in which the control piston 34 is not mechanically coupled to the brake pedal but in which an intermediate hydraulic or pneumatic control device 2 receives braking commands from the brake pedal. When the driver depresses the brake pedal 1, the piston 20 of the control device 2 compresses the fluid (or gas) contained in the chamber 21. A pressure is conveyed along the pipe 22 and via the port 88 to the inlet chamber 31 of the simulator. This pressure causes the piston 34 to move and this piston presses on the sensor rod 301, compressing the spring 310. The sensor 302 moves to the left and the operation is as described hereinabove. An alterative form of embodiment such as this offers the advantage that the brake servo and the brake master cylinder can be sited anywhere in the vehicle and, in particular, anywhere in the engine compartment, and that they do not necessarily have to be situated near the brake pedal.

In this alternative form of embodiment, the chamber 21 of the piston 20 of the control device 2 may be filled with a fluid like the inlet chamber 31 of the simulator. This fluid may be the vehicle brake fluid. These chambers are then supplied with brake fluid by a valve such as 55 connected to the brake fluid reservoir. Operation is identical to that described hereinabove.

It will be noted that, in the event of failure, the valve 55 is closed so that as much as possible of the braking force applied to the brake pedal will be transmitted to the piston 30 and therefore to the piston of the master cylinder.

In a travel controlled system, the pressure in the brakes can be expressed, disregarding friction, by the following formula:

$$Pmc = [(((Tin \times Rb) - F1) \times (S2/S1)) - F2 - F3 + F4]/S3$$

in which:
Pmc is the pressure in the master cylinder 5,
Rb is the elastic resistance of the spring 322 of the piston 30 (see FIGS. 4a and 4b),
Tin is the travel of the brake pedal 1,
F1 is the load in place of the spring 312 when the sensor 302 is in a state of equilibrium,
S1 is the cross section of the piston 30,
S2 is the cross section of the booster piston 42,
S3 is the cross section of the master cylinder piston 50,
F2 is the load in place of the spring 47 of the brake servo,
F3 is the load in place of the spring 54 of the master cylinder,
F4 is the load in place of the retaining spring 323 that retains the space 8.

In a system such as this there is independence between the force exerted by the driver on the brake pedal, the travel of this brake pedal and the pressure obtaining in the braking circuit.

The designer is therefore free to choose the most suitable master cylinder (for example one with a large volume and/or with a large travel). A system such as this can, if desired, make up for a malfunction such as, for example, the presence of a gaseous phase in the hydraulic braking circuit, without lengthening the travel of the brake pedal.

Furthermore, the primary piston of the master cylinder 5 is not, under normal operation, connected to the three-way valve.

According to an alternative form of embodiment, the operation of the brake servo can be supplemented using a hydraulic pump.

For example, the maximum saturation pressure in the master cylinder may be detected and when detected a hydraulic pump started up to inject additional pressure into the braking circuit. An arrangement such as this would, for example, enable the size of the brake servo to be reduced.

It is also possible to provide various types of sensors for detecting the travel of the brake pedal or of the simulator sensor, together with pressure and vacuum sensors.

According to another alternative form of embodiment of the invention, it is therefore advantageously possible to envisage detecting the movements of the brake pedal using, for example, a displacement transducer (for example an electro-optical sensor) which at each moment will supply the position of the brake pedal in order to determine the position of the sensor 302 in the simulator.

According to another alternative form of embodiment, provision may be made for the brake feel to be fed back to the brake pedal using an active system (for example an electromagnetic one).

According to an another alternative form it is also possible to provide for the front chamber (vacuum chamber 40 in the figures) to be placed at a pressure higher than that of conventional brake servos (higher than atmospheric pressure for example) and for the rear chamber (the working chamber 41 in the figures) to be placed at a raised pressure.

As far as the vacuum source is concerned, provision may be made for it to be achieved via the vehicle engine intake. However, it may comprise an electric pump or an engine-driven pump.

In conventional brake servos, there is a vacuum source which tends to create a vacuum in the vacuum chamber (front chamber) while the working chamber (rear chamber) is placed at atmospheric pressure under braking. In the system of the invention, it is also possible to provide a raised-pressure source connected to the working chamber in order to improve the way in which the brake servo works.

In the invention, this arrangement makes it possible to improve the effectiveness of the brake servo or reduce its diameter for the same effectiveness.

It is possible to combine an electromagnetic control coil with the system in order to alter the pressure in the master cylinder in a manner independent of driver commands, it then being possible for the system to operate at least partially in active mode under electrical control.

Furthermore, it is possible to achieve dual-gradient operation.

The system of the invention has several advantages including the following:

the system of the invention makes it possible to decouple, at the brake pedal, the braking force exerted from the feeling of braking felt as feedback by the driver.

the reaction force applied to the brake pedal can be reduced particularly if the brake pedal is operated quickly.

But equally, it is also possible, if the brake pedal is actuated quickly, to provide a function that assists with emergency braking.

Furthermore, according to the invention, operation of the master cylinder is mechanically decoupled from the brake pedal. The noise of fluctuation of the sensor that is normally perceived with the three-way valve of conventional brake servos can therefore not be heard in the cabin of the vehicle.

The system of the invention also allows the characteristics associated with the operation of the brake pedal (the travel/force characteristic and the travel/pressure characteristic in the master cylinder) to be adjusted and for this adjustment to be made independently of the absorption of the braking system.

Moreover, the system of the invention is a system free of electrical control and therefore exhibits good robustness.

In addition, the system of the invention operates practically immediately without any lag associated with the operation of electronic circuits.

Applications:

The invention can be applied to vehicles equipped:

with internal combustion engines, with electric motors equipped with recuperative electric braking systems, with both internal combustion engines and electric motors (hybrid vehicles).

It can be applied both to lightweight vehicles and to heavy goods vehicles. The diameter of the master cylinder piston will be defined according to the mass of the vehicle that is to be braked. It will be chosen small enough to be able to meet the requirements of braking when defective (i.e. of unboosted braking).

The invention claimed is:

1. Brake control system for a motor vehicle comprising a brake pedal (1), a brake booster (4) which comprises a front chamber (40) and a rear chamber (41) which are separated by a booster piston (42), said booster (4) supplying an amplified braking command dependent on the pressure difference between the two said chambers, a brake master cylinder (5) receiving the amplified braking commands from the brake booster (4), characterized in that it comprises a simulator (3) coupled pneumatically or hydraulically to the piston (42) of the brake booster (4), said simulator (3) receiving at least one braking command from the brake pedal (1) and in return establishing or controlling a pressure difference between the front chamber (40) and the rear chamber (41) of the brake booster so as to control the movement of the piston (42), characterized in that it comprises a pneumatic servomotor for controlling a pneumatic brake booster or brake servo, characterized in that said control servomotor comprises a space (8) comprising a first bore (89) in which there slides a three-way valve piston (30) equipped with a three-way valve capable of:

placing the rear chamber (41) in communication with the front chamber (40);

or of isolating the rear chamber (41) from the front chamber (40);

or of placing the rear chamber (41) in communication with a pressure source that establishes a pressure difference between the front chamber and the rear chamber, characterized in that a first region (89A) of the first bore (89) lying on one side of the three-way valve piston (30) is substantially at the same pressure as the front chamber, and in that a second region (89B) of this bore (89), lying on the opposite side of the rear chamber (41) to the three-way valve piston (30) is substantially at the same pressure as the rear chamber, characterized in that said space (8) has a first end lying in the rear chamber (41) of the booster, near to said booster piston (42), and a second end lying on the opposite side of the booster wall (46) to the side to which the brake master cylinder is attached, and in that the first region (89A) of the first bore (89) lies between said three-way valve piston (30) and the first end, while the second region (89B) of the first bore (89) lies between the three-way valve piston (30) and the second end, characterized in that said space (8) comprises a second bore (31) situated on the same side as the first end of the chamber (8) and in which there slides a control piston (34) which is controlled by the brake pedal (1) and which controls the axial movement of the sensor (302) of the three-way valve, this second bore also comprising an elastic element (310) which offers elastic resistance to the movement of the control piston (34), characterized in that the second bore (31) contains a fluid, characterized in that the second bore is supplied with fluid from a brake fluid reservoir.

2. Brake control system for a motor vehicle comprising a brake pedal (1), a brake booster (4) which comprises a front chamber (40) and a rear chamber (41) which are separated by a booster piston (42), said booster (4) supplying an amplified braking command dependent on the pressure difference between the two said chambers, a brake master cylinder (5) receiving the amplified braking commands from the brake booster (4), characterized in that it comprises a simulator (3) coupled pneumatically or hydraulically to the piston (42) of the brake booster (4), said simulator (3) receiving at least one braking command from the brake pedal (1) and in return establishing or controlling a pressure difference between the front chamber (40) and the rear chamber (41) of the brake booster so as to control the movement of the piston (42), characterized in that it comprises a pneumatic servomotor for controlling a pneumatic brake booster or brake servo, characterized in that said control servomotor comprises a space (8) comprising a first bore (89) in which there slides a three-way valve piston (30) equipped with a three-way valve capable of:
  placing the rear chamber (41) in communication with the front chamber (40);
  or of isolating the rear chamber (41) from the front chamber (40);
  or of placing the rear chamber (41) in communication with a pressure source that establishes a pressure difference between the front chamber and the rear chamber, characterized in that a first region (89A) of the first bore (89) lying on one side of the three-way valve piston (30) is substantially at the same pressure as the front chamber, and in that a second region (89B) of this bore (89), lying on the opposite side of the rear chamber (41) to the three-way valve piston (30) is substantially at the same pressure as the rear chamber, characterized in that said space (8) has a first end lying in the rear chamber (41) of the booster, near to said booster piston (42), and a second end lying on the opposite side of the booster wall (46) to the side to which the brake master cylinder is attached, and in that the first region (89A) of the first bore (89) lies between said three-way valve piston (30) and the first end, while the second region (89B) of the first bore (89) lies between the three-way valve piston (30) and the second end, characterized in that said space (8) is held against the rear wall (46) of the brake booster by a retaining spring (323) and by the pressure obtaining in the brake master cylinder when the axial force exerted on the control piston (34) is below a threshold value, and in that it can move axially when this force exceeds this threshold value.

3. Brake control system according to claim 2, characterized in that the three-way valve comprises:
  a valve body (30) having a first valve seat (309),
  a valve shutter (303) capable of moving axially and intended, by pressing against the first valve seat (309), to close off a first passage of the three-way valve and thus isolate the front (40) and rear (41) chambers from one another,
  an axially movable sensor (302) having a second valve seat intended to press against the valve shutter (303) and to open a second passage between the rear chamber and a source of raised pressure by moving away from the valve shutter (303).

4. Brake control system according to claim 3, characterized in that said space (8) comprises a second bore (31) situated on the same side as the first end of the chamber (8) and in which there slides a control piston (34) which is controlled by the brake pedal (1) and which controls the axial movement of the sensor (302) of the three-way valve, this second bore also comprising an elastic element (310) which offers elastic resistance to the movement of the control piston (34).

5. Brake control system according to claim 4, characterized in that the second bore (31) contains a fluid.

6. Brake control system according to claim 2, characterized in that said space (8) comprises a second bore (31) situated on the same side as the first end of the chamber (8) and in which there slides a control piston (34) which is controlled by the brake pedal (1) and which controls the axial movement of the sensor (302) of the three-way valve, this second bore also comprising an elastic element (310) which offers elastic resistance to the movement of the control piston (34).

7. Brake control system according to claim 6, characterized in that the control piston (34) allows action upon a rod for axially moving said sensor (302).

8. Brake control system according to claim 6, characterized in that the second bore (31) contains a fluid.

9. Brake control system according to claim 6, characterized in that it comprises an intermediate hydraulic or pneumatic control device (2) controlled by the brake pedal (1) and hydraulically or pneumatically controlling the control piston (34).

10. Brake control system according to claim 6, characterized in that said elastic element is a spring (310).

11. Brake control system for a motor vehicle comprising a brake pedal (1), a brake booster (4) which comprises a front chamber (40) and a rear chamber (41) which are separated by a booster piston (42), said booster (4) supplying an amplified braking command dependent on the pressure difference between the two said chambers, a brake master cylinder (5) receiving the amplified braking commands from the brake booster (4), characterized in that it comprises a simulator (3) coupled pneumatically or hydraulically to the piston (42) of the brake booster (4), said simulator (3) receiving at least one braking command from the brake pedal (1) and in return establishing or controlling a pressure difference between the front chamber (40) and the rear chamber (41) of the brake booster so as to control the movement of the piston (42), characterized in that it comprises a pneumatic servomotor for controlling a pneumatic brake booster or brake servo, characterized in that said control servomotor comprises a space (8) comprising a first bore (89) in which there slides a three-way valve piston (30) equipped with a three-way valve capable of:
  placing the rear chamber (41) in communication with the front chamber (40);
  or of isolating the rear chamber (41) from the front chamber (40);
  or of placing the rear chamber (41) in communication with a pressure source that establishes a pressure difference between the front chamber and the rear chamber, characterized in that the three-way valve comprises:

a valve body (30) having a first valve seat (309), a valve shutter (303) capable of moving axially and intended, by pressing against the first valve seat (309), to close off a first passage of the three-way valve and thus isolate the front (40) and rear (41) chambers from one another, an axially movable sensor (302) having a second valve seat intended to press against the valve shutter (303) and to open a second passage between the rear chamber and a source of raised pressure by moving away from the valve shutter (303), characterized in that said space (8) comprises a second bore (31) situated on the same side as the first end of the chamber (8) and in which there slides a control piston (34) which is controlled by the brake pedal (1) and which controls the axial movement of the sensor (302) of the three-way valve, this second bore also comprising an elastic element (310) which offers elastic resistance to the movement of the control piston (34), characterized in that the second bore (31) contains a fluid, characterized in that the second bore is supplied with fluid from a brake fluid reservoir.

12. Brake control system according to claim 11, characterized in that a first region (89A) of the first bore (89) lying on one side of the three-way valve piston (30) is substantially at the same pressure as the front chamber, and in that a second region (89B) of this bore (89), lying on the opposite side of the rear chamber (41) to the three-way valve piston (30) is substantially at the same pressure as the rear chamber.

13. Brake control system according to claim 12, characterized in that said space (8) has a first end lying in the rear chamber (41) of the booster, near to said booster piston (42), and a second end lying on the opposite side of the booster wall (46) to the side to which the brake master cylinder is attached, and in that the first region (89A) of the first bore (89) lies between said three-way valve piston (30) and the first end, while the second region (89B) of the first bore (89) lies between the three-way valve piston (30) and the second end.

14. Brake control system according to claim 11, characterized in that the control piston (34) allows action upon a rod for axially moving said sensor (302).

15. Brake control system according to claim 11, characterized in that it comprises an intermediate hydraulic or pneumatic control device (2) controlled by the brake pedal (1) and hydraulically or pneumatically controlling the control piston (34).

16. Brake control system according to claim 11, characterized in that said elastic element is a spring (310).

* * * * *